Patented Dec. 21, 1948

2,456,624

UNITED STATES PATENT OFFICE 2,456,624

SOLDERING AND TINNING FLUX

Thomas Brooks Crone, Tacoma, Wash.

No Drawing. Application December 15, 1944,
Serial No. 568,401

1 Claims. (Cl. 148—25)

This invention relates to a flux for use in soldering as well as in tinning. The main characteristic feature of this flux is that a small quantity of citronella oil is mixed with zinc chloride and this oil has a most remarkable effect during the process of soldering.

If, for instance, a horizontal seam is to be soldered on a vertical wall, a small amount of flux is applied, and this spreads easily and will enter the smallest cracks or crevices along the seam. It will not evaporate, so that, if the flux is applied one day the soldering operation may be completed the next day. As a test, a drop of flux solution placed on a windowpane, did not evaporate, but remained intact for six weeks.

The following is the method of preparing this soldering flux:

An acid proof container, such as a six gallon crock, is half filled with metallic zinc in small pieces over which is poured muriatic acid, or hydrochloric acid:

Hydrochloric acid_____ about 2 gallons
Oil of citronella_____ at least 2 ounces

The crock is half filled with the zinc in small lumps or strips and the muriatic acid poured over the same, the reaction producing a high temperature. More zinc may be added until no more can be dissolved in the acid. Then the oil of citronella is added immediately. In case the solution is able to dissolve more than 2 ounces of the citronella oil, more should be added up to the time maximum temperature from the reaction has been reached.

Thereupon the mixture should be permitted to stand for 24 hours, when water may be added.

For best results the following formula may be used:

1 part by volume of the above solution
1 part by volume saturated solution of sal ammoniac These proportions may be varied within reasonable limits to meet requirements.

In ordinary soldering zinc chloride solution is extensively used, but it has the disadvantage of evaporating quickly, so that in utilizing a torch for heating, the application of solder before the zinc chloride solution has evaporated, is practically impossible. So that more and more zinc chloride must be added before the solder finally takes. This repeated heating and welding often causes corrosion.

These disadvantages are obviated by my soldering flux by the introduction of citronella oil, which aids in preventing said rapid evaporation of the flux.

This soldering flux containing citronella oil can be applied on the cold metal before soldering, that is before heat is applied, preferably obtained from the use of a torch. The metal should be heated above the melting point of the solder used. When this high temperature has been reached, then the solder is applied and a heating torch used. The citronella oil prevents evaporation of the solution and obviates corrosion.

This soldering solution is much cleaner in use and faster than ordinary flux, it makes a better job and saves time, labor and heat and requires less flux and solder.

An important use of this soldering flux is for radiators in automobiles. After cleaning and washing the radiator, this soldering flux, diluted, may be used to flush the interior of the radiator to locate any leaks. By means of this soldering flux and plain solder the leaks can be reliably closed and the metal reinforced, resulting in a better radiator than when it first left the factory which gives an assurance of longer life of the machine.

It is to be understood that the invention as here disclosed is not limited to the details here described but that the same may be varied widely without departing from the spirit of the invention as defined by the subjoined claim.

I claim:

A non-evaporating soldering flux consisting of a saturated solution of metallic zinc in hydrochloric acid containing citronella oil and a saturated solution of sal ammoniac; the volumetric contents of said two saturated solutions being equal and the amount of citronella oil being in the proportion of about 1 ounce to each gallon of the hydrochloric acid solution.

THOMAS BROOKS CRONE.

REFERENCES CITED

The following references are of record in the file of this patent:

UNITED STATES PATENTS

| Number | Name | Date |
|---|---|---|
| 728,079 | Brocius et al. | May 12, 1903 |
| 1,037,234 | Bott | Sept. 3, 1912 |
| 1,225,764 | Burt | May 15, 1917 |
| 1,357,871 | Inman et al. | Nov. 2, 1920 |
| 1,642,884 | Meier | Sept. 20, 1927 |
| 2,017,354 | Rees et al. | Oct. 15, 1935 |
| 2,100,974 | Neilson | Nov. 30, 1937 |
| 2,311,669 | Kepfer | Feb. 23, 1943 |